(12) United States Patent
Wang et al.

(10) Patent No.: US 8,477,895 B1
(45) Date of Patent: Jul. 2, 2013

(54) ADAPTIVE TIMING USING CLOCK RECOVERY

(75) Inventors: Hui Wang, Pleasanton, CA (US); Yonghua Song, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/604,383

(22) Filed: Sep. 5, 2012

Related U.S. Application Data

(63) Continuation of application No. 13/323,480, filed on Dec. 12, 2011, now Pat. No. 8,265,201, which is a continuation of application No. 12/690,002, filed on Jan. 19, 2010, now Pat. No. 8,077,807, which is a continuation of application No. 11/078,717, filed on Mar. 10, 2005, now Pat. No. 7,664,204.

(51) Int. Cl.
*H04L 7/00* (2006.01)

(52) U.S. Cl.
USPC .................. 375/354; 375/355; 375/371

(58) Field of Classification Search
USPC ............ 375/130, 354, 371, 373, 374, 375, 375/376, 316, 322, 324, 326, 327, 211, 214, 375/215, 219; 327/100, 141, 144, 146, 147, 327/155, 156; 370/395.62, 503, 516, 518; 455/83–88; 398/154, 155
See application file for complete search history.

(56) References Cited

U.S. PATENT DOCUMENTS

| | | | |
|---|---|---|---|
| 5,485,490 A | 1/1996 | Leung et al. | |
| 6,122,336 A * | 9/2000 | Anderson | 375/371 |
| 6,397,042 B1 | 5/2002 | Prentice et al. | |
| 7,012,972 B1 | 3/2006 | Isaksen et al. | |
| 7,349,506 B2 | 3/2008 | Shizuki | |
| 7,363,563 B1 | 4/2008 | Hissen et al. | |
| 7,664,204 B1 | 2/2010 | Wang et al. | |
| 2003/0118137 A1 | 6/2003 | Skinner | |
| 2003/0123589 A1 | 7/2003 | Glenn et al. | |
| 2004/0213337 A1 | 10/2004 | Li et al. | |
| 2004/0252804 A1 | 12/2004 | Aoyama | |
| 2005/0286669 A1 | 12/2005 | Buchwald et al. | |

* cited by examiner

*Primary Examiner* — Tesfaldet Bocure
*Assistant Examiner* — Vineeta Panwalkar

(57) ABSTRACT

Circuits and methods are described for adaptive timing and communications. Described circuitry includes circuitry to receive an incoming data signal based on a receive clock signal, which is based on a local clock signal (LCS); an offset adjustment circuit to receive timing information relating the LCS to the incoming data signal and calculate a phase offset and a frequency offset indicative of adjustment(s) to be made to the LCS; a first phase interpolator to produce the receive clock signal by adjusting the LCS in response to the phase offset and the frequency offset; a clock recovery circuit to generate the timing information responsive to whether the receive clock signal leads or lags the incoming data signal; a second phase interpolator to produce a transmit clock signal by adjusting the LCS in response to the frequency offset; and circuitry to transmit an outgoing data signal based on the transmit clock signal.

23 Claims, 7 Drawing Sheets

ADAPTIVE TIMING USING CLOCK RECOVERY

CROSS-REFERENCE TO RELATED APPLICATION

This present disclosure is a continuation of and claims priority to U.S. application Ser. No. 13/323,480, filed on Dec. 12, 2011 (now U.S. Pat. No. 8,265,201), which is a continuation of and claims priority to U.S. application Ser. No. 12/690,002, filed on Jan. 19, 2010 (now U.S. Pat. No. 8,077,807), which is a continuation of and claims priority to U.S. application Ser. No. 11/078,717, filed on Mar. 10, 2005 (now U.S. Pat. No. 7,664,204). The content of the above-identified applications are incorporated by reference in their entireties.

BACKGROUND

The following disclosure generally relates to electrical circuits and signal processing.

Local devices can communicate with a host device using, for example, serial data transmission protocols. To comply with these protocols, local devices often must transmit data within a specified clock drift. Serial communication protocols can require tighter tolerances than parallel communication protocols, with respect to clock drift, because serial communication protocols may operate at significantly higher frequencies.

One type of serial communication protocol is serial advanced technology attachment ("SATA"). SATA requires a clock drift within a 350 ppm (parts per million) tolerance limit. However, many local devices use reference clock signals generated from inexpensive or poorly performing sources and consequentially have intolerable clock signal drifts of 1,000 ppm or more.

SUMMARY

This disclosure generally describes circuits and methods for adjusting a frequency of a local clock signal in approximating a frequency of a host clock signal. In general, in one aspect, a circuit is provided that includes a phase locked loop to generate a local clock signal having a first phase and a first frequency; an offset adjustment circuit receiving timing information relating the local clock signal to an incoming data signal, to calculate a phase offset and a frequency offset indicative of adjustments to be made to the local clock signal; a first phase interpolator, in communication with the phase locked loop and the offset adjustment circuit, to generate a receive clock signal from the local clock signal, the receive clock signal having a second phase and a second frequency responsive to the phase and frequency offsets; a clock recovery circuit, in communication with the first phase interpolator and the offset adjustment circuit, to generate the timing information responsive to whether the receive clock signal leads or lags the incoming data signal; a frequency detector, in communication with the offset adjustment circuit, to track the frequency offset and identify changes in a target frequency responsive to the frequency offset; a second phase interpolator, in communication with the phase locked loop and the frequency detector, to generate a transmit clock signal from the local clock signal having a third frequency responsive to the target frequency; and a transmitter, in communication with the second phase interpolator, to generate an outgoing data signal at the third frequency.

In general, in another aspect, a circuit is provided that includes a phase locked loop to generate a local clock signal having a first phase and a first frequency; an offset adjustment circuit receiving timing information relating the local clock signal to an incoming data signal, to calculate a phase offset and a frequency offset indicative of adjustments to be made to the local clock signal; a first phase interpolator, in communication with the phase locked loop and the offset adjustment circuit, to generate a receive clock signal from the local clock signal, the receive clock signal having a second phase and a second frequency responsive to the phase and frequency offsets; and a second phase interpolator, in communication with the phase locked loop and the offset adjustment circuit, to generate a transmit clock signal from the local clock signal having a third frequency responsive to the frequency offset.

Particular implementations may include one or more of the following features. The offset adjustment circuit can generate the frequency offset to correct a clock drift associated with the local clock signal in accordance with a frequency associated with the incoming data signal. The first phase interpolator can generate the receive clock signal having the second phase and frequency that substantially equate a frequency and a phase associated with the incoming data signal. The second phase interpolator can generate the transmit clock signal having the third frequency that substantially equates a frequency associated with the incoming data signal. The offset adjustment circuit can further comprise a first loop to accumulate timing information indicative of the phase offset. The first loop can further comprise a multiplier to apply a gain factor to timing information and generate a phase offset count; a flip flop to store the phase offset; and an adder to sum the phase offset count, the phase offset, and the frequency offset to produce an updated phase offset. The offset adjustment circuit can further comprise a second loop to accumulate timing information indicative of the frequency offset. The second loop can further comprise a multiplier to apply a gain factor to timing information and generate a frequency offset count; a flip flop to store the frequency offset; and an adder to sum the frequency offset count and the frequency offset to produce an updated frequency offset. The circuit can further comprise a clock recovery circuit, in communication with the first phase interpolator and the offset adjustment circuit, to generate timing information including an up/down signal responsive to whether the receive clock signal leads or lags the incoming data signal. The circuit can further comprise a frequency detector, in communication with the offset adjustment circuit, to track the frequency offset and identify changes in a target frequency responsive to the frequency offset. The frequency detector can track waveform bottoms when a spread spectrum clock (SSC) modulation of the incoming data signal is up-spread modulation, waveform peaks when the SSC modulation of the incoming data signal is down-spread, or waveform centers when the SSC modulation of the incoming data signal is center-spread. The circuit can further comprise a transmitter, in communication with the second phase interpolator, to generate an outgoing data signal at the third frequency.

In general, in another aspect, a system is provided that includes a local device, in communication to receive an incoming data signal, to adjust a local clock responsive to timing information extracted from the incoming data signal and generate an outgoing data signal having a drift tolerance defined by a drift tolerance associated with the incoming data signal.

Particular implementations may include one or more of the following features. The system can further comprise a host device, in communication with the local device, to generate the incoming data stream in accordance with a host clock signal. The local device can transmit the outgoing data signal using a protocol requiring a predetermined drift tolerance, the drift tolerance associated with the incoming data signal complying with the protocol.

In general, in another aspect, a method is provided that includes generating a local clock signal having a first phase and a first frequency; calculating a phase offset and a frequency offset indicative of adjustments to be made to the local clock signal; generating a receive clock signal from the local clock signal and the phase and frequency offsets, the receive clock signal having a second phase and a second frequency; receiving timing information relating the local clock signal to an incoming data signal; tracking the frequency offset to identify changes in a target frequency; generating a transmit clock signal having a third frequency from the local clock and the frequency offset; and transmitting an outgoing data signal having the third frequency.

In general, in another aspect, a method is provided that includes generating a clock signal having a first phase and a first frequency; calculating a phase offset and a frequency offset to adjust the clock signal in accordance with an incoming data signal; generating a receive clock signal having a second frequency and a second phase responsive to the phase and frequency offsets with respect to the incoming clock signal; and generating a transmit clock signal having a third frequency responsive to the frequency offset.

Particular implementations may include one or more of the following features. Calculating can comprise calculating the frequency offset to correct a clock drift associated with the local clock signal in accordance with a frequency associated with the incoming data signal. Generating can comprise generating the receive clock signal from the local clock signal, the receive lock signal having the second phase and second frequency that substantially equate a frequency offset and a phase associated with the incoming data signal. Generating the transmit clock signal can comprise generating the transmit clock signal having the third frequency that substantially equates a frequency associated with the incoming data signal. Calculating the phase and frequency offset can comprise accumulating timing information indicative of the phase offset. Accumulating timing information can comprise applying a gain factor to timing information and generating a phase offset count; storing the phase offset; and summing the phase offset count, the phase offset, and the frequency offset to produce an updated phase offset. Calculating the phase and frequency offset can comprise accumulating timing information indicative of the frequency offset. Accumulating timing information can comprise applying a gain factor to timing information to generate a frequency offset count; storing the frequency offset; and summing the frequency offset count and the frequency offset to produce an updated frequency offset. The method can further comprise generating timing information including an up/down signal responsive to whether the receive clock signal leads or lags the incoming data signal. The method can further comprise tracking the frequency offset to identify changes in a target frequency responsive to the frequency offset. Tracking can comprise tracking waveform bottoms when a spread spectrum clock (SSC) modulation of the incoming data signal is up-spread modulation, waveform peaks when the SSC modulation of the incoming data signal is down-spread, or waveform centers when the SSC modulation of the incoming data signal is center-spread. The method can further comprise generating an outgoing data signal at the third frequency.

In general, in another aspect, a circuit is provided that includes means for generating a local clock signal having a first phase and a first frequency; means for adjusting receiving timing information relating the local clock signal to an incoming data signal, to calculate a phase offset and a frequency offset indicative of adjustments to be made to the local clock signal; means, in communication with the means for generating the local clock signal and the means for adjustment, for generating a receive clock signal from the local clock signal, the receive clock signal having a second phase and a second frequency responsive to the phase and frequency offsets; and means, in communication with the means for generating the local clock signal and means for adjusting, for generating a transmit clock signal from the local clock signal having a third frequency responsive to the frequency offset.

Advantageously, the proposed circuits and methods can leverage a tolerance limit of clock drift associated with a host clock signal to produce a local clock signal substantially within the tolerance limit.

DETAILED DESCRIPTION

Figure 1:
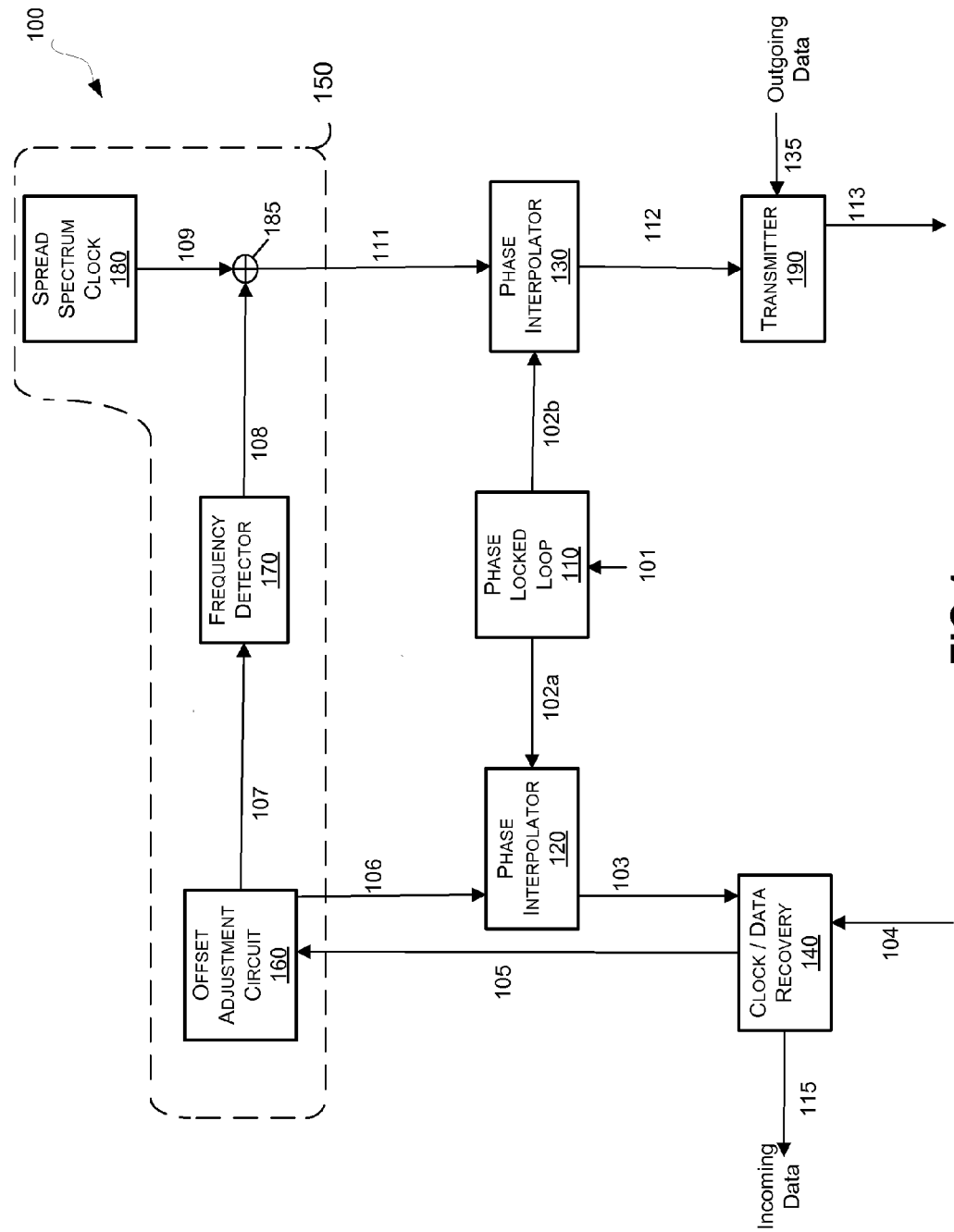
FIG. 1 is a block diagram illustrating a circuit to adjust a frequency of a local clock signal.

FIG. 1 is a block diagram illustrating a circuit 100 that adjusts a local clock signal. Circuit 100 includes phase locked loop ("PLL") 110, phase interpolators 120, 130, a clock/data recovery ("CDR") circuit 140, processing circuits 150, and a transmitter 190. Processing circuits 150 further include an offset adjustment circuit 160, a frequency detector 170, a spread spectrum clock (SSC) 180 and an adder 185. In one implementation, SSC 180 is external to processing circuits 150 and, accordingly, processing circuits 150 includes only an input in communication with SSC 180.

PLL 110 includes an input for receiving a reference clock signal 101. PLL 110 includes outputs for producing local clock signals 102a,b. Reference clock signal 101 can be locally generated and can have phase and/or frequency differences relative to an incoming data signal 104. PLL 110 generates clock signals 102a,b at a set frequency from reference clock signal 101 using components such as a voltage controlled oscillator, a phase comparator, a filter, an amplifier, and a divider (not shown). In one implementation, clock signals 102a and 102b have a common frequency and/or phase.

Phase interpolator 120 includes a first input in communication with PLL 110 for receiving local clock signal 102a and a second input in communication with offset adjustment circuit 160 for receiving offset signal 106. Phase interpolator 120 includes an output for producing receive clock signal 103. Offset signal 106 is indicative of a phase shift and a frequency shift necessary to adjust the local clock signal 102a in accordance with the incoming data signal 104 as described in further detail below in association with FIG. 2A. Phase interpolator 120 adjusts a phase and/or a frequency of local clock signal 102a to generate receive clock signal 103. Phase interpolator 120 makes adjustments based on two relationships. First, phase interpolator 120 adjusts the phase of local clock signal 102a in accordance with the changing input signal (i.e., $\omega_2=\omega_1+\Delta\omega$, where $\omega_2$ represents the phase of receive clock signal 103, $\omega_1$ represents the phase of local clock signal 102a, and $\Delta\omega$ represents an accumulated difference between the phase of incoming data signal 104 and local clock signal 102a). Further, phase interpolator 120 adjusts the frequency of receive clock signal 103 in accordance with changes in offset signal 106 (i.e., $f=\omega_1+\Delta\omega)/2\Pi$, where f represents the frequency of receive clock signal 103).

CDR circuit 140 includes a first input in communication with phase interpolator 120 for receiving receive clock signal 103. CDR 140 includes a second input for receiving incoming data signal 104. CDR circuit 140 includes outputs for producing an up/down signal 105 and data signal 115 (i.e., incoming data in a serial or parallel data stream). In one implementation, incoming data signal 104 can be a stream of serial bits transmitted from a host using a host clock signal at a high data rate. CDR circuit 140 extracts timing information from incoming data signal 104, for example, by determining whether a phase of receive clock signal 103 leads or lags a phase of incoming data signal 104. In response, CDR circuit 140 generates up/down signal 105. For example, in one implementation, CDR circuit 140 generates a discrete signal such as a positive pulse when a rising edge of receive clock signal 103 occurs earlier than a rising edge of incoming data signal 104. In this example, CDR circuit 140 generates a discrete, negative pulse when the rising edge of incoming data signal 104 occurs earlier than the rising edge of receive clock signal 103. CDR circuit 140 can also output recovered data (i.e., data signal 115) to higher layer software for data processing.

Offset adjustment circuit 160 includes an input in communication with CDR circuit 140 for receiving up/down signal 105. Offset adjustment circuit 160 includes outputs for producing offset signals 106, 107. Offset adjustment circuit 160 generates offset signal 106 responsive to a difference between a phase and a frequency of local clock signal 102a, with respect to incoming data signal 104, as indicated by up/down signal 105. Offset adjustment circuit 160 generates offset signal 107 responsive to a difference between the frequency of local clock signal 102a with respect to incoming data signal 104. The frequency difference can stem in part from clock drift associated with local clock signal 102a. Details of offset adjustment circuit 160 are discussed below in association with FIGS. 2A-B.

Frequency detector 170 includes an input in communication with offset adjustment circuit 160 for receiving offset signal 107. Frequency detector 170 includes an output for producing frequency signal 108. In one implementation, frequency detector 170 is configured according to an SSC modulation scheme of a host producing incoming data signal 104 (e.g., up-spread, down-spread, or center-spread modulation). Frequency detector 170 identifies a target frequency of incoming data signal 104 and subsequent changes in frequency. Frequency detector 170 can be set to extract changes in the target frequency based on the SSC modulation. Since SSC modulation inherently changes frequencies, frequency detector 170 can be configured to find bottoms for an up-spread modulation scheme, peaks for a down-spread modulation scheme, or centers (or averages) for a center-spread modulation scheme. The bottoms, peaks, and centers are indicative of the target frequency. Frequency detector 170 generates a signal (i.e., frequency signal 108), by tracking offset signal 107 over a window (e.g., a window of 10 peaks) to identify changes in the target frequency. SSC modulation schemes are described in further detail below in association with FIGS. 4A-D.

In one implementation, SSC 180 is configured according to a particular SSC modulation scheme for outgoing data transmission. Accordingly, SSC 180 produces an SSC modulation signal 109 to reduce an energy level at a target frequency. Adder 185 applies SSC modulation signal 109 to frequency signal 108 to provide a modulated offset signal 111.

Phase interpolator 130 includes a first input in communication with PLL 110 for receiving local clock signal 102b and a second input in communication with adder 185 for receiving modulated offset signal 111. Phase interpolator 130 includes an output for producing transmit clock signal 112. Phase interpolator 130 adjusts local clock signal 102b according to a frequency offset of modulated offset signal 111 (according to frequency signal 108 in one implementation). As a result, phase interpolator 130 generates transmit clock signal 112 having a frequency substantially equating a frequency associated with incoming data signal 104. Phase alignment of transmit clock signal 112 with incoming data signal 104, although not necessary to practice described implementations, can be provided in other implementations.

Transmitter 190 includes a first input in communication with phase interpolator 130 for receiving transmit clock signal 112 and a second input for receiving a data signal 135 (e.g., outgoing data in a parallel or serial stream). Transmitter 190 includes an output for producing an output data signal 113. Transmitter 190 transmits output data signal 113 (e.g., to a host) at a frequency determined by transmit clock signal 112. In one implementation, output data signal 113 can be a stream of serial bits transmitted to a host.

Figure 2A:
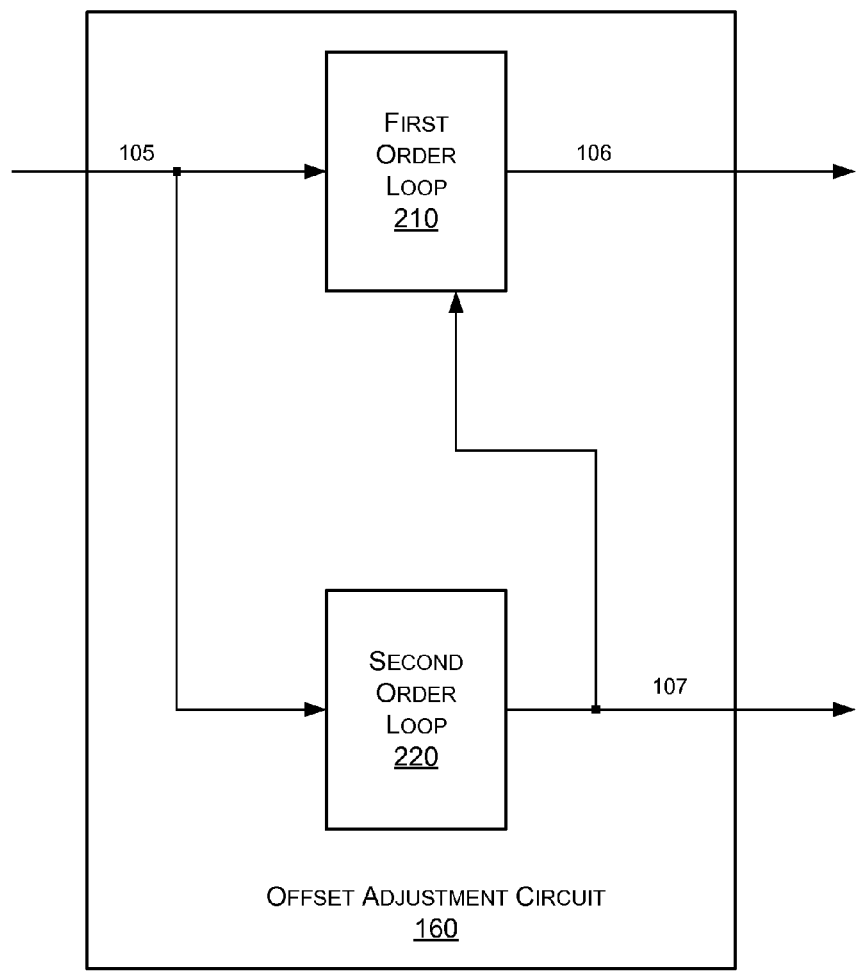
FIGS. 2A-B are a block diagram and a schematic diagram illustrating an offset adjustment circuit.

FIG. 2A is a block diagram illustrating one implementation of offset adjustment circuit 160. Offset adjustment circuit 160 includes a first order loop 210 and a second order loop 220.

First order loop 210 includes inputs for receiving up/down signal 105 and offset signal 107. First order loop 210 includes an output for producing offset signal 106. First order loop 210 accumulates timing information from up/down signal 105 to generate offset signal 106 as a combination of frequency offset information received from second order loop 220 and phase offset information generated within first order loop 210.

Second order loop 220 includes an input for receiving up/down signal 105 and an output for producing offset signal 107. Second order loop 220 accumulates timing information from up/down signal 105 to generate frequency offset information produced in the form of offset signal 107.

Figure 2B:
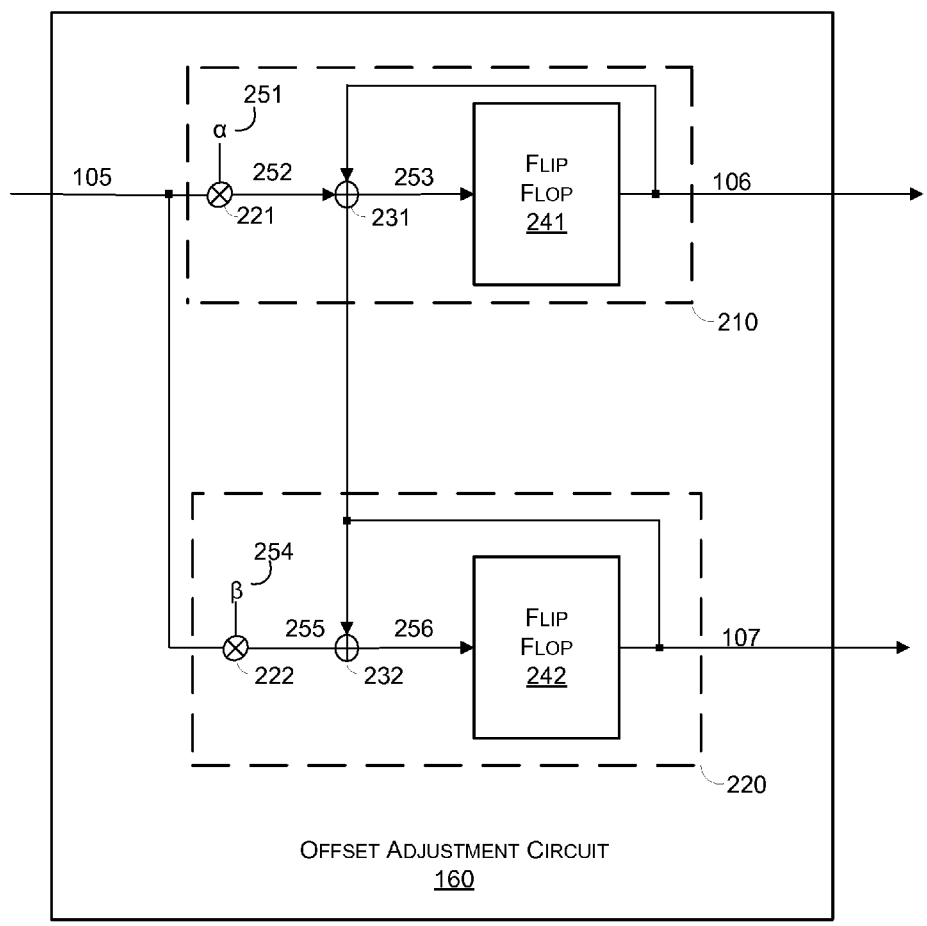

FIG. 2B is a schematic diagram illustrating offset adjustment circuit 160. The offset adjustment circuit 160 includes first order loop 210 and second order loop 220. First order loop 210 further includes a multiplier 221, an adder 231, and a flip flop 241. Second order loop further includes a multiplier 222, an adder 232, and a flip flop 242.

Within first order loop 210, multiplier 221 includes inputs for receiving up/down signal 105 and alpha gain signal 251. Multiplier 221 includes an output for generating an up/down count signal 252. Alpha gain signal 251 can have a variable value such as substantially ¼. Multiplier 221 applies alpha gain signal 251 to up/down signal 105 to generate up/down count signal 252 indicative of an update to phase offset signal 106. In one implementation, multiplier 221 outputs a product of up/down signal 105 and alpha gain signal 251 as fractional increments such as ±0.25. In another implementation, multiplier 221 outputs whole increments such as ±1 by using a counter (not shown) to accumulate fractional increments.

Adder 231 includes inputs in communication with multiplier 221 for receiving up/down count signal 252, in communication with flip flop 241 for receiving offset signal 106, and in communication with flip flop 242 for receiving offset signal 107. Adder 231 includes an output for generating an accumulated offset signal 253. Offset signals 106 and 107 are indicative of previous accumulated totals for first order loop 210 and second order loop 220, respectively. Adder 231 sums offset signal 106, offset signal 107 and up/down count signal 252 to generate accumulated offset signal 253 indicative of desired changes to both phase and frequency.

Flip flop 241 includes an input in communication with adder 231 for receiving accumulated offset signal 253 and an output for producing offset signal 106. Flip flop 241 can be a D-type storage element with set and reset capability. Flip flop 241 stores the accumulated signal from a previous clock pulse which it feeds back to adder 231 for inclusion in an updated accumulated offset.

Within second order loop 220, multiplier 222 includes inputs for receiving up/down signal 105 and beta gain signal 254. Multiplier 222 includes an output for producing an up/down count signal 255. Beta gain signal 254 can have a variable value substantially smaller than alpha gain signal 251 such as substantially $1/256$. Multiplier 221 applies beta gain signal 254 to up/down signal 105 to generate an up/down count signal 255 indicative of a change to phase of local clock signals 102$a,b$.

Adder 232 includes inputs in communication with multiplier 222 for receiving up/down count signal 255 and flip flop 242 for receiving offset signal 107. Adder 232 includes an output for generating an accumulated offset signal 256. Adder 232 sums offset signal 107 and up/down count signal 255 to generate the accumulated offset signal 256 indicative of a desired change to frequency offset.

Flip flop 242 includes inputs in communication with adder 232 for receiving the accumulated offset signal 256 and an output for producing offset signal 107. Flip flop 242 stores the accumulated offset associated with a given clock pulse which flip flop 242 subsequently feeds back to adder 232 for inclusion in an update to accumulated offset signal 256.

Figure 3A:
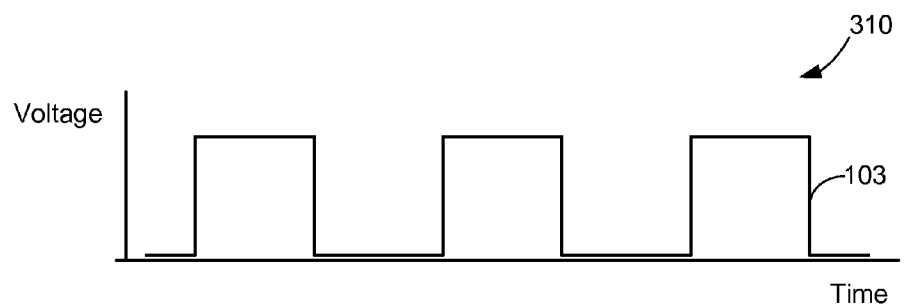
FIGS. 3A-C are timing diagrams illustrating waveforms associated with an up/down signal.

FIG. 3A is a timing diagram 310 illustrating an exemplary waveform of receive clock signal 103. Receive clock signal 103 can have a square waveform that changes from no voltage to a positive voltage on a rising edge and from the positive voltage to no voltage on a falling edge. A pulse width of the square waveform is generally indicative of a frequency of receive clock signal 103. In other implementations, receive clock signal 103 can have alternative waveforms (e.g., saw tooth, cosine, etc.) at alternative voltage levels.

Figure 3B:
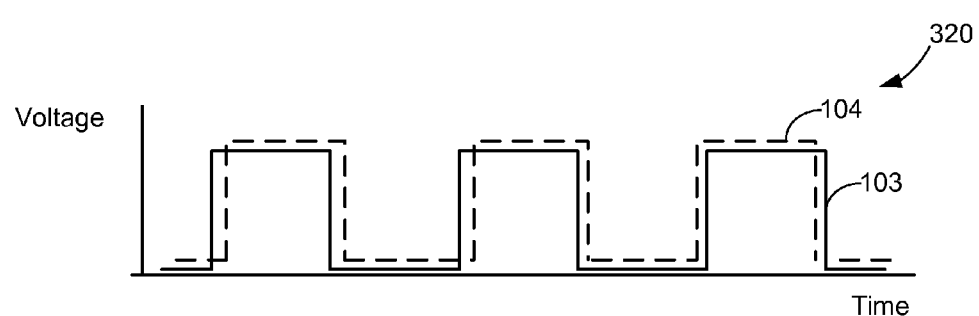

FIG. 3B is a timing diagram 320 illustrating an exemplary waveform of incoming data signal 104. Incoming data signal 104 can change between no voltage to indicate a 0 bit and a positive voltage to indicate a 1 bit. Receive clock signal 103 is superimposed on timing diagram 320 to show a phase offset with respect to edges of incoming data signal 104.

Figure 3C:
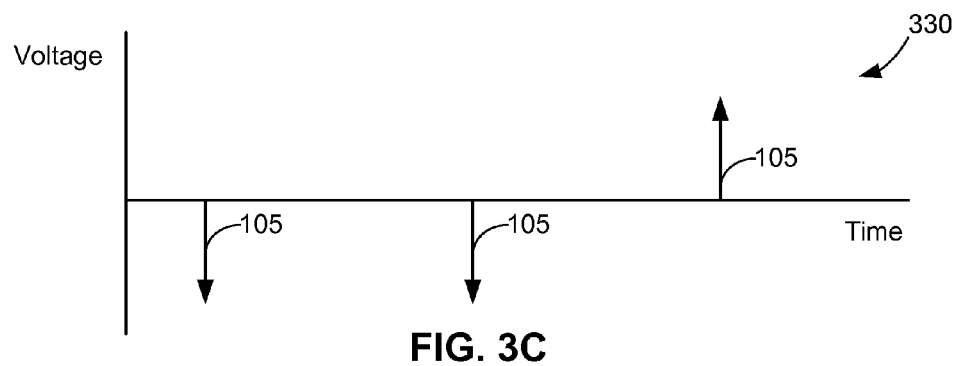

FIG. 3C is a timing diagram 330 illustrating an exemplary waveform of up/down signal 105. A positive pulse is indicative of, for example, a rising edge of receive clock signal 103 leading a rising edge of incoming data signal 104. A negative pulse is indicative of, for example, a rising edge of receive clock signal 104 lagging a rising edge of incoming data signal 104. Leading/lagging can occur as a result of phase and/or frequency differences.

Figure 4A:
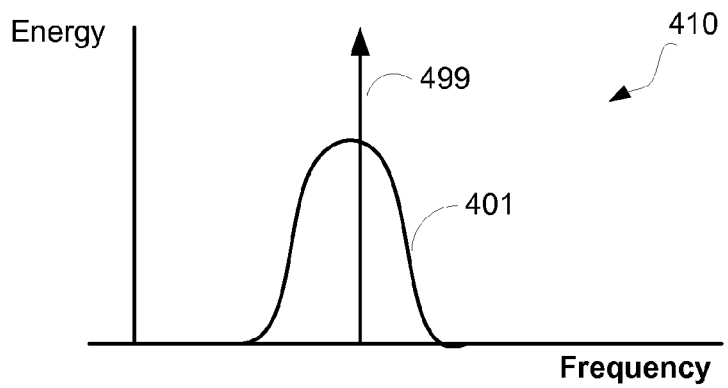
FIGS. 4A-D are frequency diagrams and a timing diagram illustrating spread spectrum clock (SSC) modulation.

FIG. 4A is a frequency diagram illustrating a graph 410 of a center-spread signal 401 using SSC modulation. Center-spread signal 401 is shown in contrast to a constant frequency signal 499 which has a spike of energy at a target frequency. By contrast, center-spread signal 401 has a frequency that varies above and below the target frequency. A reduction in energy at the target frequency reduces electromagnetic energy generated during transmission of, for example, incoming or outgoing data signals 104,113 (FIG. 1).

Figure 4B:
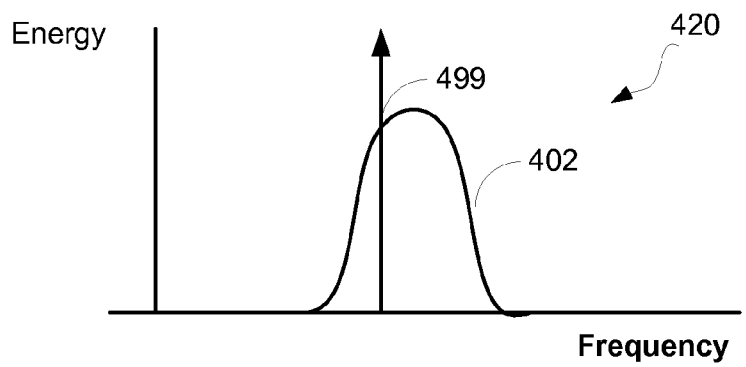

FIG. 4B is a frequency diagram 420 illustrating a graph 420 of an up-spread signal 402 using SSC modulation. Up-spread signal 402 is shown in contrast to constant frequency signal 499. Up-spread signal 402 has a frequency that oscillates mostly above the target frequency.

Figure 4C:
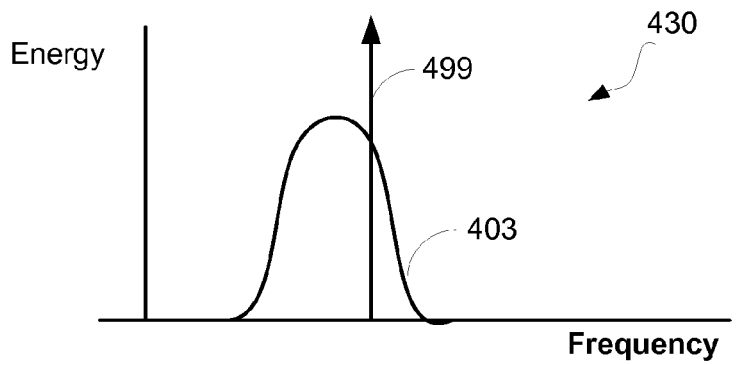

FIG. 4C is a frequency diagram 430 illustrating a graph 430 of a down-spread signal 403 using SSC modulation. Down-spread signal 403 is shown in contrast to constant frequency signal 499. Down-spread signal 403 has a frequency that oscillates mostly below the target frequency.

Figure 4D:
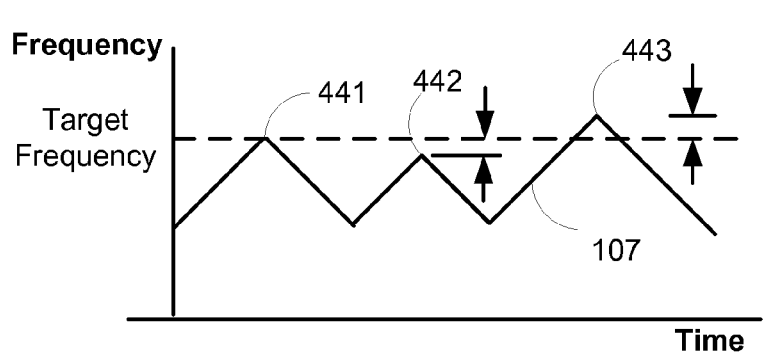

FIG. 4D is a timing diagram 440 illustrating offset signal 107 in view of up-spread SSC modulation as an example. Offset signal 107 increases (i.e., indicates a lagging receive clock signal 103) due to, for example, an SSC modulation of incoming data signal 104 being on a falling slope. Similarly, offset signal 107 decreases (i.e., indicates a leading receive clock signal 103) due to, for example, an SSC modulation of incoming data signal 104 being on a rising slope. In addition, offset signal 107 can increase or decrease due to clock drift associated with local clock signal 102$a$. Thus, a necessary frequency adjustment can be measured from windowing or averaging successive peaks 441-443.

Figure 5:
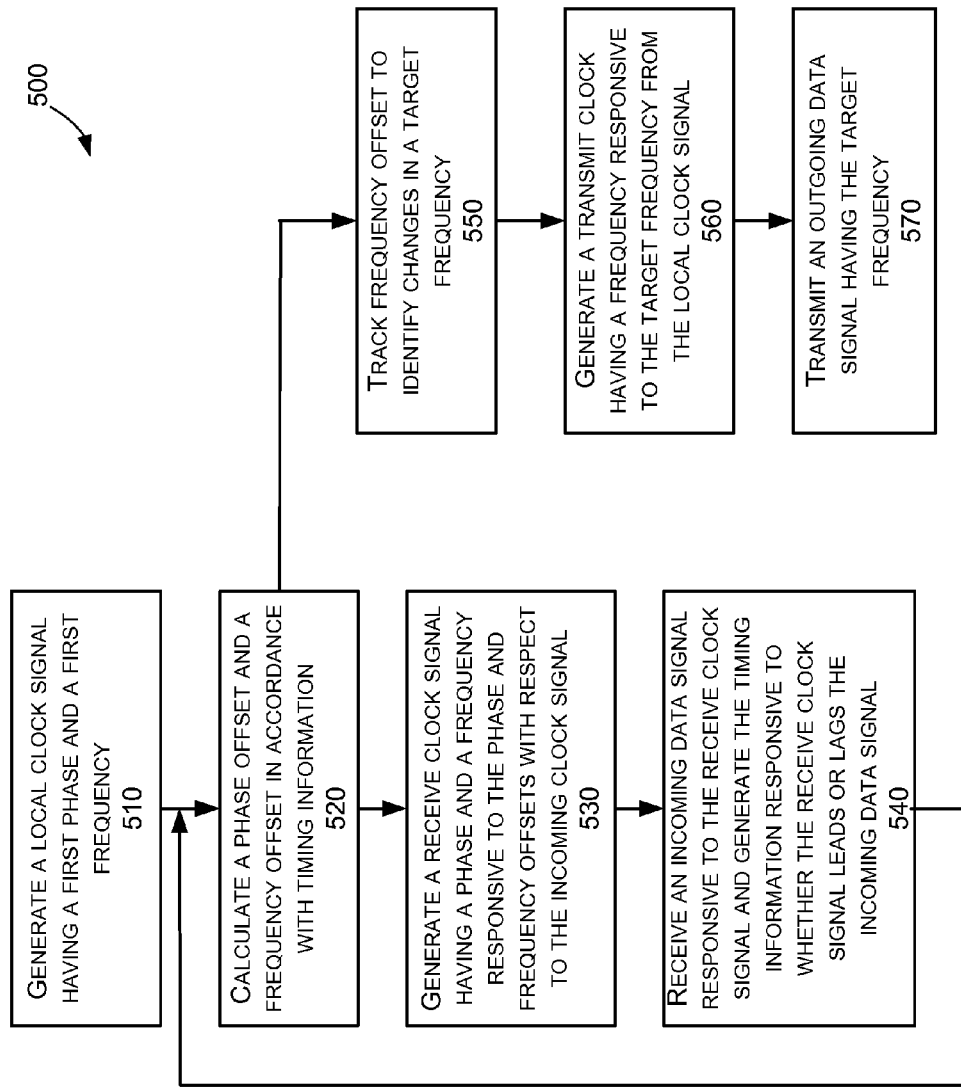
FIG. 5 is a flow diagram illustrating a method for adjusting a frequency of a local clock signal.

FIG. 5 is a flow diagram illustrating a method 500 for adjusting a local clock signal (e.g., local clock signals 102$a$ and 102$b$) in approximating an incoming data signal (e.g., incoming data signal 104). The local clock signal is generated 510 (e.g., by using PLL 110). The local clock signal has a phase and a frequency.

A phase offset and a frequency offset are calculated to adjust the clock signal in accordance with timing information 520 (e.g., by using offset adjustment circuit 160). The local clock signal is generated (e.g., receive clock signal 103) from the local clock signal 530 (e.g., by phase interpolator 120). The receive clock signal has a phase and a frequency responsive to the phase offset and the frequency offset. An incoming data signal is received according to the receive clock signal and timing information is generated 540. In one implementation, the timing information is responsive to whether the receive clock signal leads or lags the incoming data signal.

The frequency offset is tracked to identify changes in a target frequency 550 (e.g., by frequency detector 170). A local clock signal (e.g., local clock signal 102$b$) is adjusted to generate a transmit clock signal 560 (e.g., transmit clock signal 112 by phase interpolator 130). The transmit clock signal has a frequency that approximates a frequency of the host clock signal. An outgoing data signal (e.g., outgoing data signal 113) is generated to transmit outgoing data (e.g., outgoing signal 135) to the host at substantially the frequency used by the host 570 (e.g., by transmitter 190).

Figure 6:
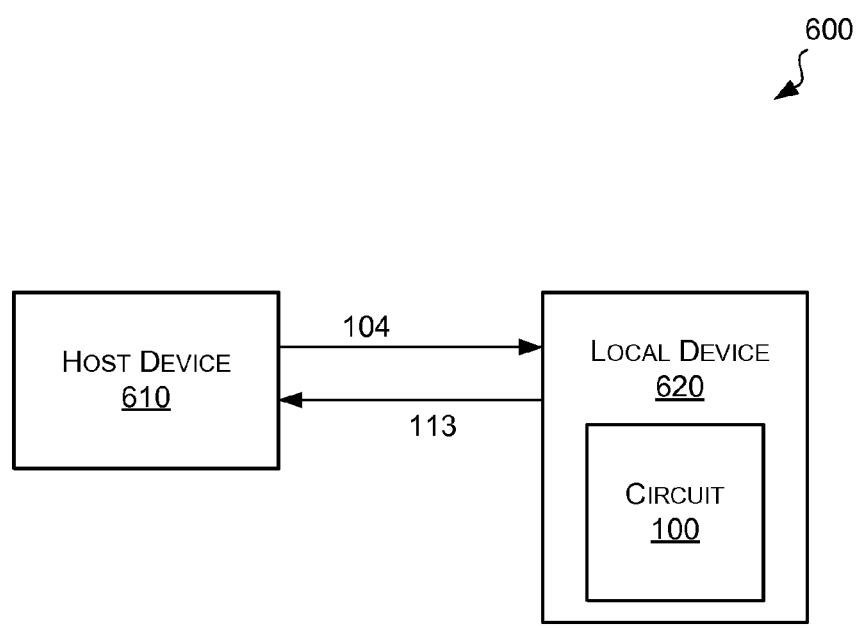
FIG. 6 is a block diagram illustrating a local device in communication with a host device.

FIG. 6 is a block diagram illustrating a system 600 using circuit 100. System 600 includes a host device 610 and a local device 620 including circuit 100.

Host device 610 includes an input in communication with local device 620 for receiving outgoing data signal 113 and an output for producing incoming data signal 104. Host device 610 is, for example, a personal computer, a mobile device, or any other device capable of communication with local device 620. Host device 610 can generate incoming data signal 104 by modulating data into a serial bit stream according to an SSC modulation protocol with a target frequency. Incoming data signal 104 is transmitted from the host device 610 at a frequency associated with a host clock signal. In one implementation, host device 610 communicates with local device 620 using a serial communications protocol such as serial advanced technology attachment ("SATA").

Local device 620 includes an input in communication with host device 610 for receiving incoming data signal 104 and an output for producing outgoing data signal 113. Local device 620 is, for example, a hard drive or other storage device, a video card, or any other internal or external device capable of transmitting to and receiving data from host device 610. Local device 620 can generate outgoing data signal 113 at the target frequency by adjusting a local clock signal. The adjustment leverages the incoming data signal 104 to generate the outgoing data signal 113 within a clock drift tolerance of the host device 610 as required by, for example, communication protocols such as SATA. In one implementation, circuit 100 modulates output data signal 113 in accordance with an SSC modulation protocol.

A number of implementations have been described. Nevertheless, it will be understood that various modifications may be made. Accordingly, other implementations are within the scope of the following claims.

What is claimed is:

1. An apparatus, comprising:
   circuitry configured to receive an incoming data signal based on a receive clock signal, wherein the receive clock signal is based on a local clock signal;
   an offset adjustment circuit configured to receive timing information relating the local clock signal to the incoming data signal and calculate a phase offset and a frequency offset indicative of one or more adjustments to be made to the local clock signal;
   a first phase interpolator configured to produce the receive clock signal by adjusting the local clock signal in response to the phase offset and the frequency offset;
   a clock recovery circuit configured to generate the timing information responsive to whether the receive clock signal leads or lags the incoming data signal;
   a second phase interpolator configured to produce a transmit clock signal by adjusting the local clock signal in response to the frequency offset; and
   circuitry configured to transmit an outgoing data signal based on the transmit clock signal.

2. The apparatus of claim 1, wherein the offset adjustment circuit generates the frequency offset to correct a clock drift associated with the local clock signal in accordance with a frequency associated with the incoming data signal.

3. The apparatus of claim 1, wherein the offset adjustment circuit comprises:
   a first loop to accumulate timing information indicative of the phase offset; and
   a second loop to accumulate timing information indicative of the frequency offset.

4. The apparatus of claim 3, wherein the first loop comprises:
   a multiplier to apply a gain factor to the timing information indicative of the phase offset and generate a phase offset count;
   a flip flop to store the phase offset; and
   an adder to sum the phase offset count, the phase offset, and the frequency offset to produce an updated phase offset.

5. The apparatus of claim 3, wherein the second loop comprises:
   a multiplier to apply a gain factor to the timing information indicative of the frequency offset and generate a frequency offset count;
   a flip flop to store the frequency offset; and
   an adder to sum the frequency offset count and the frequency offset to produce an updated frequency offset.

6. The apparatus of claim 1, further comprising:
   a frequency detector configured to track the frequency offset and identify changes responsive to the frequency offset, wherein the second phase interpolator is configured to produce the transmit clock signal by adjusting the local clock signal in response to the changes.

7. The apparatus of claim 6, wherein the incoming data signal is transmitted by a host device, the host device being configured to generate the incoming data signal using spread spectrum clock (SSC) modulation based on a SSC frequency, wherein the frequency detector is configured to detect the SSC modulation.

8. The apparatus of claim 7, wherein the frequency detector is configured to track (i) waveform bottoms when the SSC modulation of the incoming data signal is up-spread modulation, (ii) waveform peaks when the SSC modulation of the incoming data signal is down-spread, or (iii) waveform centers when the SSC modulation of the incoming data signal is center-spread.

9. A system comprising:
   a host device configured to transmit a host data signal based on a host clock signal; and
   a local device comprising:
      circuitry configured to receive, based on a receive clock signal, the host data signal from the host device as an incoming data signal, wherein the receive clock signal is based on a local clock signal;
      an offset adjustment circuit configured to receive timing information relating the local clock signal to the incoming data signal and calculate a phase offset and a frequency offset indicative of one or more adjustments to be made to the local clock signal;
      a first phase interpolator configured to produce the receive clock signal by adjusting the local clock signal in response to the phase offset and the frequency offset;
      a clock recovery circuit configured to generate the timing information responsive to whether the receive clock signal leads or lags the incoming data signal;
      a second phase interpolator configured to produce a transmit clock signal by adjusting the local clock signal in response to the frequency offset; and
      circuitry configured to transmit, based on the transmit clock signal, an outgoing data signal to the host device.

10. The system of claim 9, wherein the offset adjustment circuit generates the frequency offset to correct a clock drift associated with the local clock signal in accordance with a frequency associated with the incoming data signal.

11. The system of claim 9, wherein the offset adjustment circuit comprises:
   a first loop to accumulate timing information indicative of the phase offset; and
   a second loop to accumulate timing information indicative of the frequency offset.

12. The system of claim 11, wherein the first loop comprises:
   a multiplier to apply a gain factor to the timing information indicative of the phase offset and generate a phase offset count;
   a flip flop to store the phase offset; and
   an adder to sum the phase offset count, the phase offset, and the frequency offset to produce an updated phase offset.

13. The system of claim 11, wherein the second loop comprises:
   a multiplier to apply a gain factor to the timing information indicative of the frequency offset and generate a frequency offset count;

a flip flop to store the frequency offset; and
an adder to sum the frequency offset count and the frequency offset to produce an updated frequency offset.

14. The apparatus of claim 9, further comprising:
a frequency detector configured to track the frequency offset and identify changes responsive to the frequency offset, wherein the second phase interpolator is configured to produce the transmit clock signal by adjusting the local clock signal in response to the changes.

15. The system of claim 14, wherein the host device is configured to generate the host data signal using spread spectrum clock (SSC) modulation based on a SSC frequency, wherein the frequency detector is configured to detect the SSC modulation.

16. The system of claim 15, wherein the frequency detector is configured to track (i) waveform bottoms when the SSC modulation of the incoming data signal is up-spread modulation, (ii) waveform peaks when the SSC modulation of the incoming data signal is down-spread, or (iii) waveform centers when the SSC modulation of the incoming data signal is center-spread.

17. A method, comprising:
receiving an incoming data signal based on a receive clock signal, wherein the receive clock signal is based on a local clock signal;
determining a phase offset and a frequency offset indicative of one or more adjustments to be made to the local clock signal based on timing information relating the local clock signal to the incoming data signal;
producing the receive clock signal by adjusting the local clock signal in response to the phase offset and the frequency offset;
generating the timing information responsive to whether the receive clock signal leads or lags the incoming data signal;
producing a transmit clock signal by adjusting the local clock signal in response to the frequency offset; and
transmitting an outgoing data signal based on the transmit clock signal.

18. The method of claim 17, wherein the determining comprises calculating the frequency offset to correct a clock drift associated with the local clock signal in accordance with a frequency associated with the incoming data signal.

19. The method of claim 18, wherein calculating the phase and frequency offset comprises:
accumulating timing information indicative of the phase offset; and
accumulating timing information indicative of the frequency offset.

20. The method of claim 17, further comprising:
tracking the frequency offset to identify changes responsive to the frequency offset, wherein producing the transmit clock signal comprises adjusting the local clock signal in response to the changes.

21. The method of claim 20, wherein the incoming data signal is transmitted by a host device, the host device being configured to generate the incoming data signal using spread spectrum clock (SSC) modulation based on a SSC frequency, wherein tracking the frequency offset comprises detecting the SSC modulation.

22. The method of claim 21, wherein tracking comprises tracking waveform bottoms when the SSC modulation of the incoming data signal is up-spread modulation, waveform peaks when the SSC modulation of the incoming data signal is down-spread, or waveform centers when the SSC modulation of the incoming data signal is center-spread.

23. The method of claim 18, wherein the incoming data signal is received from a host device, and wherein the outgoing data signal is transmitted to the host device.

* * * * *